(12) United States Patent
Tai et al.

(10) Patent No.: US 10,266,177 B2
(45) Date of Patent: Apr. 23, 2019

(54) VEHICLE WARNING SYSTEM

(71) Applicant: HONGFUJIN PRECISION ELECTRONICS (TIANJIN) CO.,LTD., Tianjin (CN)

(72) Inventors: Ling-Chieh Tai, New Taipei (TW); Po-Cheng Chen, New Taipei (TW); Kuang-Yu Liu, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 4 days.

(21) Appl. No.: 15/640,588

(22) Filed: Jul. 3, 2017

(65) Prior Publication Data

US 2018/0362041 A1    Dec. 20, 2018

(30) Foreign Application Priority Data

Jun. 16, 2017   (CN) .......................... 2017 1 0462642

(51) Int. Cl.
*B60Q 1/52* (2006.01)
*B60W 30/16* (2012.01)

(52) U.S. Cl.
CPC ............. *B60W 30/16* (2013.01); *B60Q 1/525* (2013.01)

(58) Field of Classification Search
CPC ............................... B60W 30/16; B60Q 1/525
See application file for complete search history.

(56) References Cited

U.S. PATENT DOCUMENTS

| 6,204,778 | B1* | 3/2001 | Bergan | G08G 1/075 340/905 |
| 9,437,109 | B1* | 9/2016 | Stafford | F21L 4/02 |
| 2011/0301802 | A1* | 12/2011 | Rupp | G08G 1/0112 701/408 |
| 2012/0101711 | A1* | 4/2012 | Furmston | G01S 7/415 701/300 |
| 2014/0156182 | A1* | 6/2014 | Nemec | G05D 1/021 701/430 |
| 2014/0288811 | A1* | 9/2014 | Oura | G08G 1/0116 701/119 |
| 2016/0202077 | A1* | 7/2016 | Huang | G06K 9/00805 701/540 |
| 2016/0377508 | A1* | 12/2016 | Perrone | G01M 17/06 180/204 |
| 2017/0187707 | A1* | 6/2017 | Miu | H04L 63/0823 |

FOREIGN PATENT DOCUMENTS

TW        201626347        7/2016

* cited by examiner

*Primary Examiner* — Behrang Badii
*Assistant Examiner* — Daniel L Greene
(74) *Attorney, Agent, or Firm* — ScienBiziP, P.C.

(57) ABSTRACT

A vehicle warning system includes a warning tripod and a portable electronic device able to communicate with the warning tripod. Based on a location of a stationary vehicle or other road obstacle, the portable electronic device controls the warning tripod to automatically move to a position to warn other vehicles, and after the warning function is carried out, the portable electronic device controls the warning tripod to automatically move back to the stationary vehicle.

20 Claims, 3 Drawing Sheets

VEHICLE WARNING SYSTEM

CROSS-REFERENCE TO RELATED APPLICATIONS

This application claims priority to Chinese Patent Application No. 201710462642.7, filed on Jun. 16, 2016, the contents of which are incorporated by reference herein.

FIELD

The subject matter herein generally relates to road safety, and especially relates to a vehicle warning system.

BACKGROUND

Accidents often occur on highways. When an accident occurs, a driver should position a warning tripod one hundred meters behind a stationary vehicle to alert approaching vehicles.

BRIEF DESCRIPTION OF THE DRAWINGS

Implementations of the present technology will now be described, by way of example only, with reference to the attached figures.

DETAILED DESCRIPTION

Figure 1:
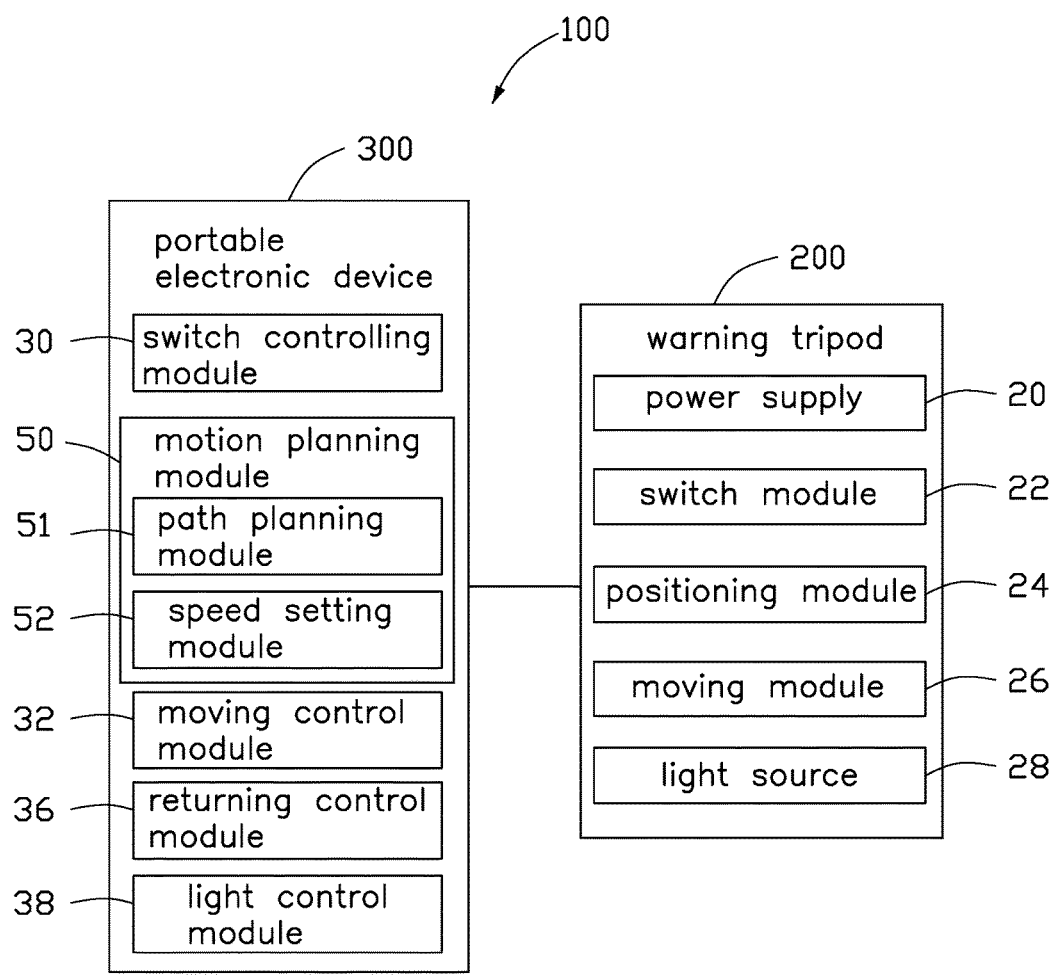
FIG. 1 is a block diagram of a vehicle warning system according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

A definition that applies throughout this disclosure will now be presented.

The term "comprising" means "including, but not necessarily limited to"; it specifically indicates open-ended inclusion or membership in a so-described combination, group, series, and the like.

The instant disclosure provides a vehicle warning system 100. The vehicle warning system 100 includes a warning tripod 200 and a portable electronic device 300 communicating with the warning tripod 200, as shown in FIG. 1. The portable electronic device 300 can communicate with the warning tripod 200 through a wireless connection (e.g., Bluetooth). The portable electronic device 300 may be a mobile phone. At a location of a vehicle involved in an accident, for example, the portable electronic device 300 may control the warning tripod 200 to automatically move to a position to warn other vehicles. After warning function is carried out, the portable electronic device 300 may control the warning tripod 200 to automatically move back to the location of the vehicle.

The warning tripod 200 includes a power supply 20, a switch module 22, a positioning module 24, a moving module 26, and at least one light source 28. The switch module 22 turns on and off the power supply 20. In the embodiment, the portable electronic device 300 includes a switch controlling module 30. The switch controlling module 30 controls the switch module 22 to turn on and off. In another embodiment, the switch module 22 is a switch button. The switch module 22 is manually controlled. The positioning module 24 is configured to obtain instant location details of the warning tripod 200. The instant location details of the warning tripod 200 include whether a road, on which the warning tripod 200 is to function, is curved and is cambered, for the relevant length of the road.

The vehicle warning system 100 further includes a motion planning module 50. In the embodiment, the motion planning module 50 is executed on the portable electronic device 300. The portable electronic device 300 further includes a moving control module 32. The motion planning module 50 includes a path planning module 51. Based on an instant location of the warning tripod 200, a preset starting moving direction of motion, and a required distance (safety distance), the path planning module 51 plans a motion path of the warning tripod 200. The motion path includes at least one motion direction and a motion distance at each motion direction. A distance between a starting point and an ending point of the motion path is equal to the safety distance. Based on the motion path and a preset motion speed, the moving control module 32 sends a moving control signal to the moving module 26. Based on the moving control signal, the moving module 26 controls the warning tripod 200 to move at the preset motion speed along the motion path. The portable electronic device 300 further includes a returning control module 36. In response to a return to origin operation on the portable device 300, the returning control module 36 sends a return to origin signal to the moving module 26. The warning tripod 200 further includes at least one light source 28. The portable electronic device 300 further includes a light control module 38. In response to an illuminate operation, the light control module 38 sends a light control signal to illuminate the light source 28.

The preset starting moving direction can be a fixed direction, such as southeast. The preset starting moving direction can be determined by a user when the warning tripod 200 is placed on the road. In one embodiment, when the road is a straight road, the motion path includes a single motion direction and a motion distance along the motion direction, and the motion distance is equal to the safety distance. In another embodiment, when the positioning road is a curved road, the motion path includes a number of motion directions and a number of motion distances at each motion direction.

In the embodiment, the motion planning module 50 further includes a speed setting module 52. The speed setting module 52 is configured to preset the motion speed. In another embodiment, the preset motion speed is a preset fixed speed. In an embodiment, the safety distance is fixed, for example, one hundred meters.

Figure 2:
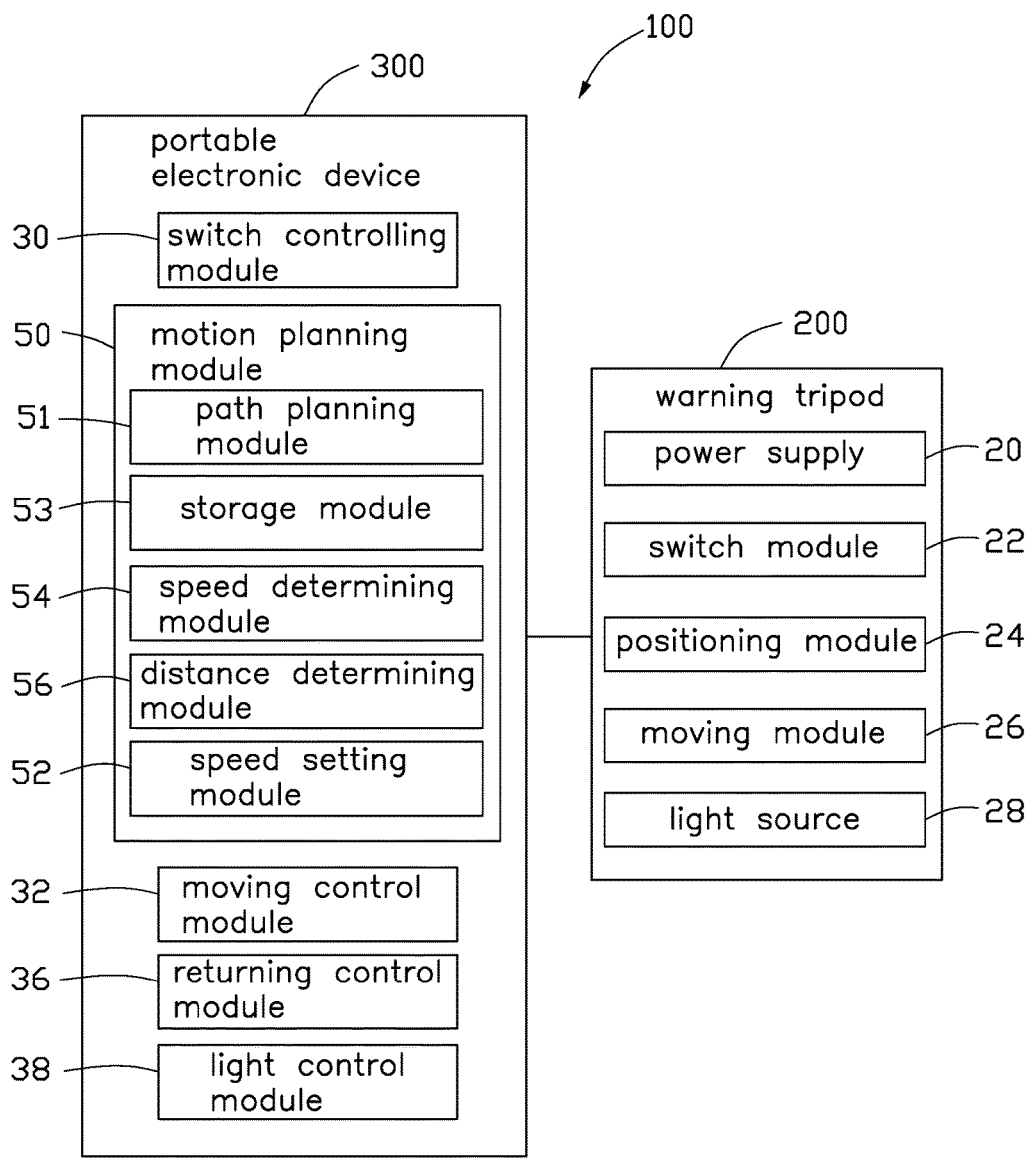
FIG. 2 a block diagram of a vehicle warning system according to a second embodiment.

FIG. 2 illustrates, in another embodiment, that the safety distance is adjustable. With similar numerals representing similar features in FIG. 1, a vehicle warning system 100 in FIG. 2 includes a warning tripod 200 and a portable electronic device 300 communicating with the warning tripod 200, where the warning tripod 200 includes a power supply 20, a switch module 22, a positioning module 24, a moving module 26, and at least one light source 28, and portable electronic device 300 includes a switch controlling module 30, a motion planning module 50, a moving control module 32, a returning control module 36, and a light control module 38. The motion planning module 50 includes a storage module 53, a speed determining module 54, and a distance determining module 56. The storage module 53 stores geographic information. The geographic information may include, for example, a map and a maximum speed applied to each road in the map. Based on the position of the warning tripod 200 and the geographic information, the speed determining module 54 determines the maximum speed correspond to the road where the warning tripod 200 is positioned. The storage module 53 further stores a relationship between the maximum speed and the safety distance. Based on the relationship and the determined maximum speed, the speed determining module 54 may determine the safety distance to correspond to the position of the warning tripod 200.

Figure 3:
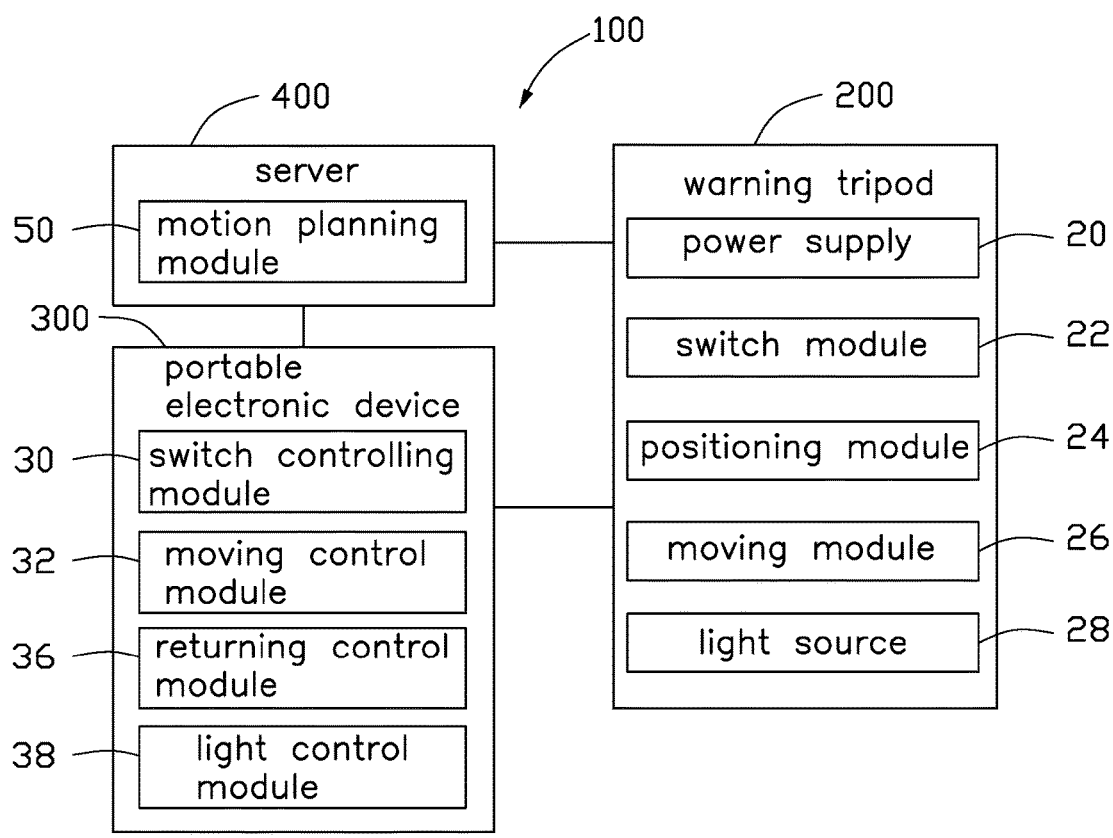
FIG. 3 is a block diagram of a vehicle warning system according to a third embodiment.

In FIG. 3, in another embodiment, with similar numerals representing similar features in FIG. 1, a vehicle warning system 100 includes a warning tripod 200 and a portable electronic device 300 communicating with the warning tripod 200, where the warning tripod 200 includes a power supply 20, a switch module 22, a positioning module 24, a moving module 26, and at least one light source 28, and portable electronic device 300 includes a switch controlling module 30, a moving control module 32, a returning control module 36, and a light control module 38. The vehicle warning system 100 further includes a server 400 communicating with the warning tripod 200 and the portable electronic device 300. The motion planning module 50 is executed on the server 400. The motion speed is a preset fixed speed.

The portable electronic device 300 further includes a returning control module 36. In response to a return to origin operation on the portable device 300, the returning control module 36 sends a return to origin signal to the moving module 26. Based on the signal, the moving module 26 controls the warning tripod 200 to reverse and move back to the location of the accident vehicle at a preset returning speed and the motion path. The preset returning speed is same as the motion speed.

The warning tripod 200 further includes the at least one light source 28. The portable electronic device 300 further includes the light control module 38. In response to an illuminate operation, the light control module 38 sends a light control signal to illuminate the light source 28.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A vehicle warning system comprising:
    a warning tripod comprising:
        a power supply;
        a positioning module configured to obtain a location of the warning tripod, the location of the warning tripod comprising whether a road where the warning tripod is positioned is curved, and a camber and a length of the curved road;
        a moving module; and
    a portable electronic device comprising:
        a motion planning module comprising a path planning module, the path planning module configured to plan a motion path of the warning tripod, based on the location of the warning tripod, a starting moving direction and a safety distance; the motion path comprising at least one motion direction and a motion distance at each motion direction, a distance between a starting point and an ending point of the motion path being equal to the safety distance;
        a moving control module configured to send a moving control signal to the moving module based on the motion path and a motion speed;
    wherein based on the moving control signal, the moving module controls the warning tripod to move at the motion speed and the motion path.

2. The vehicle warning system as claimed in claim 1, wherein the motion planning module comprises a storage module, a speed determining module and a distance determining module, the storage module stores geographic information, the geographic information comprises a map and a maximum speed of each road in the map, based on the location of the warning tripod and the geographic information, the speed determining module determines the maximum speed correspond to the location road, the storage module further stores a relationship between the maximum speed and the safety distance, based on the relationship and the determined maximum speed, the speed determining module determines the safety distance corresponding to the location of the warning tripod.

3. The vehicle warning system as claimed in claim 2, wherein portable electronic device further comprises a returning control module, in response to a return to origin operation on the portable device, the returning control module sends a return to origin signal to the moving module, based on the return to origin signal, the moving module controls the warning tripod to reverse and move back at a returning speed and the motion path.

4. The vehicle warning system as claimed in claim 3, wherein the returning speed is same as the motion speed.

5. The vehicle warning system as claimed in claim 1, wherein the motion planning module further comprises a speed setting module, the speed setting module is configured to set the motion speed.

6. The vehicle warning system as claimed in claim 1, wherein the motion speed is a fixed speed.

7. The vehicle warning system as claimed in claim 1, wherein when the road is a curved road, the motion path comprises a plurality of motion directions and a plurality of motion distances for each of the corresponding plurality of motion directions.

8. The vehicle warning system as claimed in claim 1, wherein when the road is a straight road, the motion path comprises one motion direction and a motion distance at the motion direction, and the motion distance is equal to the safety distance.

9. The vehicle warning system as claimed in claim 1, wherein the portable electronic device communicates with the warning tripod through a wireless connection.

10. The vehicle warning system as claimed in claim 1, wherein the portable electronic device is a mobile phone.

11. A vehicle warning system comprising:
a warning tripod comprising:
- a power supply;
- a positioning module configured to obtain a location of the warning tripod, the location of the warning tripod comprising whether a road where the warning tripod is positioned is curved, and a camber and a length of the curved road;
- a moving module; and a server communicating with the warning tripod and comprising:
- a motion planning module comprising a path planning module, the path planning module configured to plan a motion path of the warning tripod, based on the location of the warning tripod, a starting moving direction and a safety distance; the motion path comprising at least one motion direction and a motion distance at each motion direction, a distance between a starting point and an ending point of the motion path being equal to the safety distance; and a portable electronic device communicating with the server and the warning tripod, the portable electronic device comprising:
- a moving control module configured to send a moving control signal to the moving module based on the motion path and a motion speed;

wherein based on the moving control signal, the moving module controls the warning tripod to move at the motion speed and the motion path.

12. The vehicle warning system as claimed in claim 11, wherein the motion planning module comprises a storage module, a speed determining module and a distance determining module, the storage module stores geographic information, the geographic information comprises a map and a maximum speed of each road in the map, based on the location of the warning tripod and the geographic information, the speed determining module determines the maximum speed correspond to the location road, the storage module further stores a relationship between the maximum speed and the safety distance, based on the relationship and the determined maximum speed, the speed determining module determines the safety distance corresponding to the location of the warning tripod.

13. The vehicle warning system as claimed in claim 12, wherein portable electronic device further comprises a returning control module, in response to a return to origin operation on the portable device, the returning control module sends a return to origin signal to the moving module, based on the return to origin signal, the moving module controls the warning tripod to reverse and move back at a returning speed and the motion path.

14. The vehicle warning system as claimed in claim 13, wherein the returning speed is same as the motion speed.

15. The vehicle warning system as claimed in claim 11, wherein the motion planning module further comprises a speed setting module, the speed setting module is configured to set the motion speed.

16. The vehicle warning system as claimed in claim 11, wherein the motion speed is a fixed speed.

17. The vehicle warning system as claimed in claim 11, wherein when the road is a curved road, the motion path comprises a plurality of motion directions and a plurality of motion distances for each of the corresponding plurality of motion directions.

18. The vehicle warning system as claimed in claim 11, wherein when the road is a straight road, the motion path comprises one motion direction and a motion distance at the motion direction, and the motion distance is equal to the safety distance.

19. The vehicle warning system as claimed in claim 11, wherein the portable electronic device communicates with the warning tripod through a wireless connection.

20. The vehicle warning system as claimed in claim 11, wherein the portable electronic device is a mobile phone.

* * * * *